Figure 1:
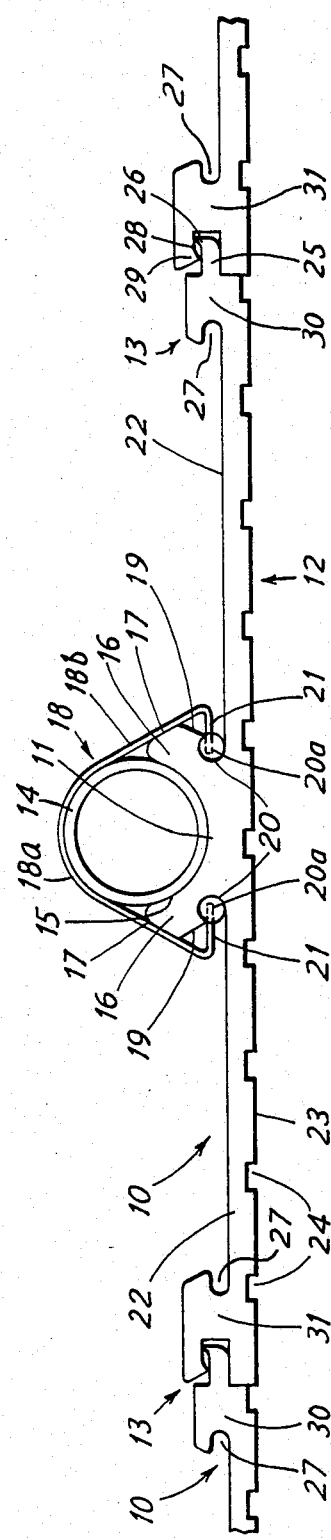

United States Patent [19]
Smith

[11] Patent Number: 4,646,500
[45] Date of Patent: Mar. 3, 1987

[54] CEILING PANEL

[75] Inventor: Ian W. Smith, Stokenchurch, England

[73] Assignee: Frenger Troughton Limited, Middlesex, England

[21] Appl. No.: 691,983

[22] Filed: Jan. 16, 1985

[30] Foreign Application Priority Data

Jan. 20, 1984 [GB] United Kingdom ............. 8401490

[51] Int. Cl.⁴ ........................... E04B 5/54; E04B 5/57
[52] U.S. Cl. ....................................... 52/489; 52/506; 52/761
[58] Field of Search ............... 52/484, 585, 761, 506, 52/513, 489, 357–360, 144, 145, 761

[56] References Cited

U.S. PATENT DOCUMENTS

| | | | |
|---|---|---|---|
| 386,378 | 7/1888 | Bright | 52/484 |
| 755,122 | 3/1904 | Fisher | 52/585 |
| 1,596,291 | 8/1926 | Nadon | 52/360 |
| 1,998,424 | 1/1935 | Manske | 52/585 |
| 2,066,205 | 12/1936 | Keating | 52/506 |
| 2,082,314 | 6/1937 | Venzie | 52/506 |
| 3,640,033 | 2/1972 | Rijnders | 52/506 |
| 3,968,837 | 7/1976 | Makara | 52/145 |

FOREIGN PATENT DOCUMENTS

| | | | |
|---|---|---|---|
| 31644 | 10/1961 | Finland | 52/144 |
| 1245450 | 9/1960 | France | 52/489 |
| 744931 | 2/1956 | United Kingdom | 52/144 |
| 750297 | 6/1956 | United Kingdom . | |
| 758604 | 10/1956 | United Kingdom . | |
| 807649 | 1/1959 | United Kingdom . | |
| 1068676 | 5/1967 | United Kingdom . | |
| 1226587 | 3/1971 | United Kingdom . | |
| 2036298 | 6/1980 | United Kingdom . | |

Primary Examiner—James L. Ridgill, Jr.
Attorney, Agent, or Firm—Wenderoth, Lind & Ponack

[57] ABSTRACT

The invention relates to a metal ceiling panel for a heat radiating ceiling which can be arranged in a coplanar array with like ceiling panels or it can be secured to the upper side of selected metal sheets which are arranged in a coplanar array. The panel of the invention has a central, lengthwise extending broad rib formation defining a channel of part-cylindrical form which is adapted to receive a heating pipe in good heat conducting contact therewith. The rib formation also has portions adapted to receive the ends of a one-piece band used to hold the heating pipe in the channel. The portions of the rib which receive the ends of a one-piece band may have enlarged inner end portions adapted to receive pins inserted at the ends of the panels for aligning the ends of adjoining panels in a line extending parallel to the pipe. The edges of the panels may have a tongue and groove arrangement for engaging adjoining panels. The panels have major surfaces which are substantially flat except for the rib formation extending outwardly from one major surface and optional ribs formed by grooves on the opposite major surface for greater heat dissipation efficiency of the panel. A clip which extends about the pipe has a part circular central section which lies against the pipe, two legs which extend obliquely outwards from the central section and the free ends of the legs extend inwards towards each other to form retaining feet.

13 Claims, 4 Drawing Figures

CEILING PANEL

This invention relates to ceiling panels and has a particularly useful but not exclusive application in ceiling panels which are intended to be heated by pipes carrying hot water.

According to the present invention there is provided a ceiling panel formed in one piece and having on one face thereof a channel of part-cylindrical form for receiving a pipe to which the panel is to be connected and means for retaining a band, e.g. a clip, extending about the pipe to connect said panel to the pipe.

In a preferred construction there are also provided, at the side edge of the panel remote from the channel, means such as tongue and groove formations for interengaging adjacent panels.

Figure 2:
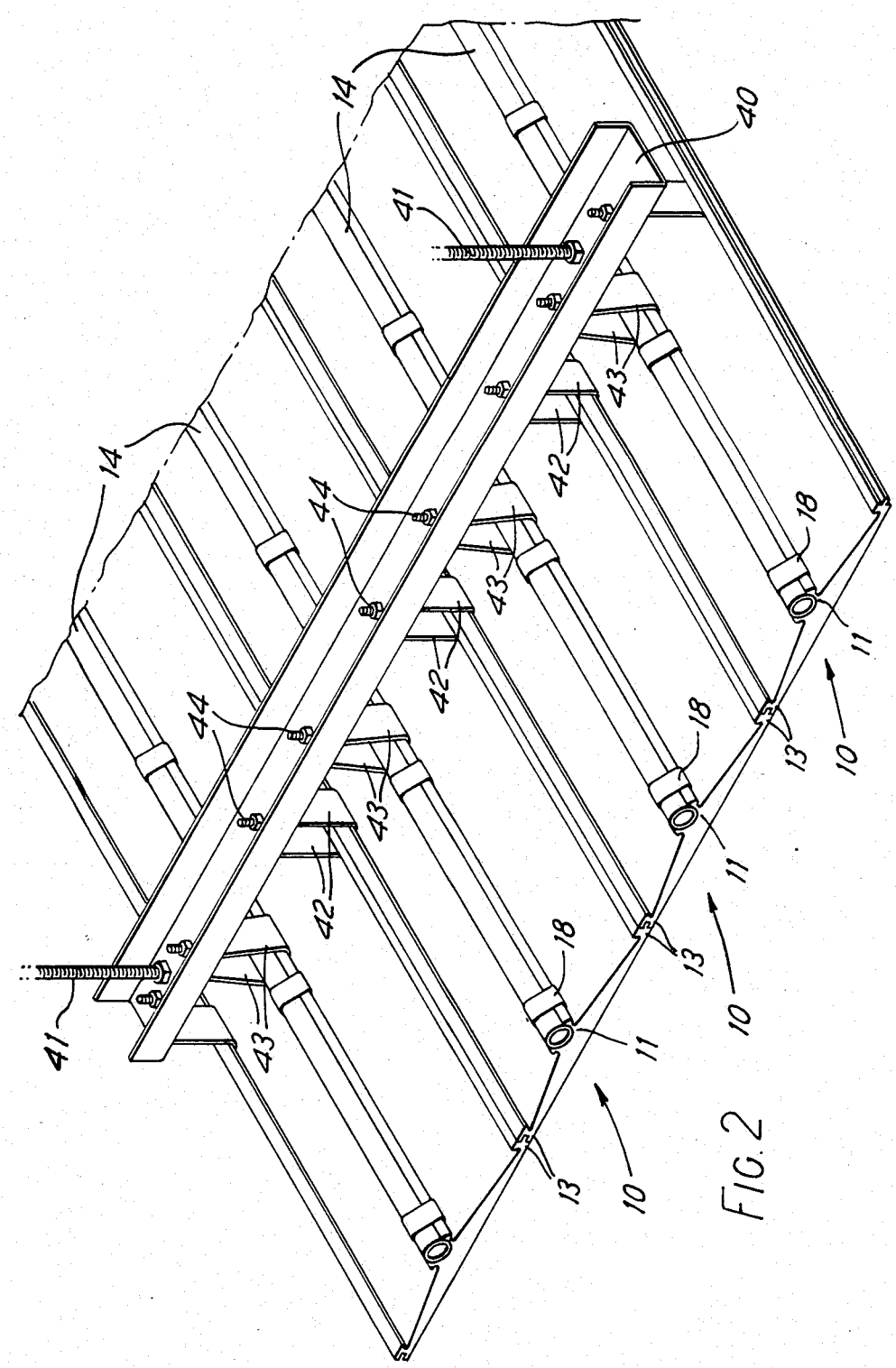
Figure 3:
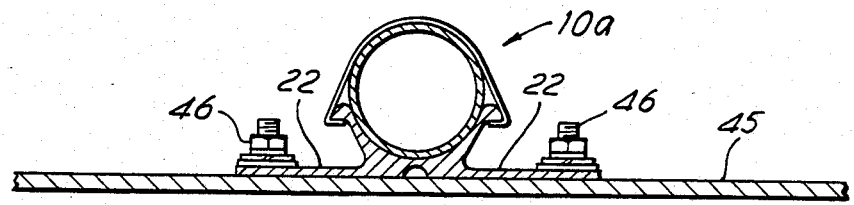
Figure 4:
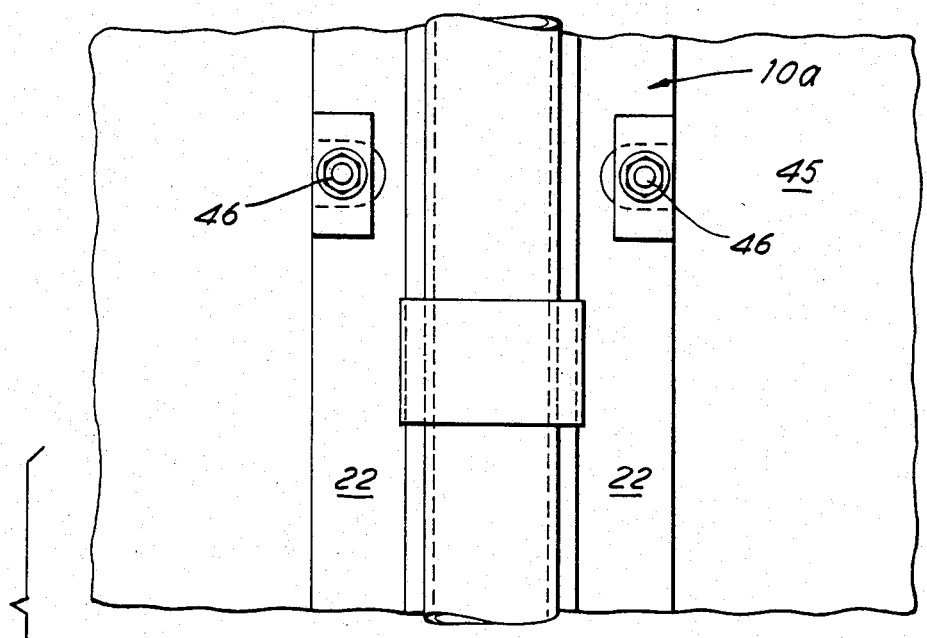
Figure 4:
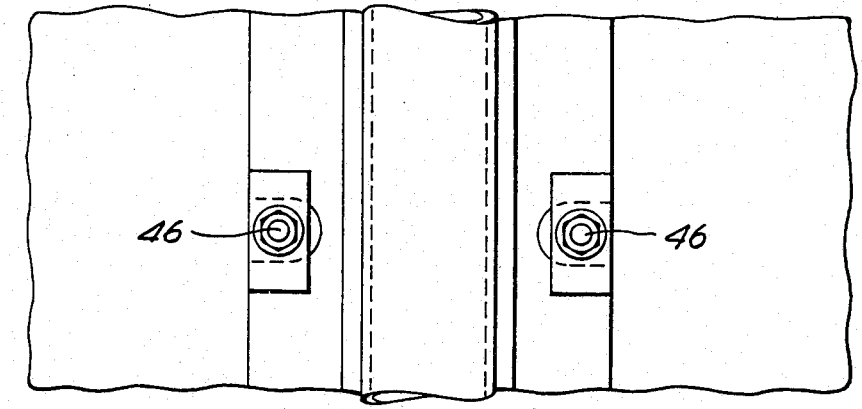

One embodiment of the invention will now be described by way of example. The description makes reference to the accompanying diagrammatic drawings in which:

FIG. 1 shows in cross-section a panel according to the invention interengaged at each of its side edges with a similar panel, FIG. 2 is a perspective view from above showing how an assembly of panels as shown in FIG. 1 may be supported, and FIG. 3 and 4 show in sectional elevation and plan a modified form of the panel of FIG. 1 for use in applications where a lower heat output is required.

Referring to FIG. 1 of the drawings, the panel 10 comprises a body section 12 having an integral, solid central broad rib formation 11 on its upper face and having means 13 at its side edges for interengagement with the next adjacent panel or panels. The panel is of constant cross-section and is extruded from aluminium or an alternative material of good heating conductivity. A channel 15 of part-circular cross-section extends centrally along the rib and is a snug fit on a copper pipe 14 which, in use, has hot water flowing through it. The curvature of the channel is exactly matched to the external diameter of the pipe 14 so as to provide good thermal contact between the surface of the channel 15 and the pipe 14 and hence high heating efficiency.

A spring clip 18 extends about the pipe and secures the panel to the pipe. The spring clip has a part circular central section 18a which lies against the pipe. Two straight legs 18b extend obliquely outwards from the curved section, the free ends of the legs 18b extending horizontally inwards to form retaining feet 21.

The laterally outward facing surfaces of the broad rib are in the form of oppositely disposed lugs 16. The upper sections of the lugs have oblique surfaces 17 which face upward and laterally outward. The upper extremities of the surfaces 17 curve laterally inward so as to form a smooth continuation of surface 15. The lower sections of the lugs have oblique surfaces 19 which face laterally inward and downward. Thus the widest part of the broad rib, over which the feet of the spring clip 18 must pass is where the surfaces 17, 19 meet. At the lower extremities of surfaces 19 there are provided undercuts 20 of part-circular cross-section. The undercuts meet the lower extremities of the surfaces 19 to form edges against which the retaining feet 21 of the clips press. The undercuts are of a radius such that they form smooth continuations of the top surfaces of the side portions 22 of the body of the panel. Undercuts 20 serve also to receive pins (20a) which are inserted at the ends of the panels to align adjacent panels end-to-end.

The free ends of the feet 21 are spaced so that, when fastening the panel to the pipe, the tips of the feet meet the oblique surfaces 17 so as to be pressed apart by the cam action of surfaces 17 when pressure is applied and, when they have passed the widest part of the broad rib, snap into the undercuts thus rigidly holding the panel to the pipe.

On the under-surface 23 of the panel there are a plurality of rectangular grooves 24 located between lengthwise extending ribs which increase the surface area of the underside of the panel and thus improve the heat dissipation efficiency of the panel. The grooves may, however, be of any cross-section or may be dispensed with entirely.

The means 13 for joining the panels together side-edge to side-edge comprises a tongue and groove arrangement and, in order to accommodate the necessary formations, the side edge portions of each panel are of increased thickness as shown at 30, 31. Edge portion 30 of the panel 10 has a tongue 25 which extends in a substantially horizontal direction and the free end of which is turned up slightly at 26. The opposite edge portion 31 of the panel has a lengthwise-extending groove 28. At the extremity of the upper edge of the groove a downwardly turned lip 29 is formed.

The turn-up portion 26 of the tongue and lip 29 enable the tongue and groove to be engaged by a combined rotational and lateral relative movement of the two panels. A recess 27 extends along the inner side edges of each edge portion 30, 31 for a purpose described below.

FIG. 2 of the drawings shows how the panels can be supported, so as to form a false ceiling, by means of transversely extending channel-section members 40 spaced apart lengthwise of the panels and disposed parallel to each other. The members 40 are suspended from a fixed roof or ceiling structure (not shown) by theaded rods 41 the lower ends of which extend through holes in the members 40, the members being adjustably located lengthwise of the rods by means of nuts engaged on threads and disposed above and below the members 40. The panels 10 are in turn each suspended from the members 40 by pairs of hook elements 43 and 42 alternating lengthwise of members 40. The hook elements 43, 42 are made from strip material and the upper ends of each pair of the elements are attached to the underside of the members 40 by fasteners in for of bolts and nuts 44. The lower ends of the hook elements 43 are engaged in the undercuts 20 of the broad ribs of the panels and the lower ends of the hook elements 42 are engaged in the recesses 27 extending along the inner sides of the interengaging edge portions 30, 31 respectively of adjoining panels.

FIGS. 3 and 4 illustrate a modified form of the panel shown in FIGS. 1 and 2 for use in locations where a lower heat output is required than that given by the arrangement of FIGS. 1 and 2, for a given temperature of the water in the pipe 14. The features of the panel 10a shown in FIGS. 3 and 4 corresponding to those in FIGS. 1 and 2 are indicated by corresponding reference numerals. The panel 10a differs chiefly in being narrower and being secured to the upper face of a sheet 45 made from aluminium or other metal having good heat conductivity characteristics. In order to secure the panel and the sheet together two lines of screw-threaded studs 46 which are welded to the upper face of sheet 45 project through holes in the side portions 22 of the panels and carry spring clips, washers and nuts for clamping the panel to the sheet.

If desired a mastic having good heat-transmitting properties may be disposed between the panel and sheet on assembly, and may also be disposed between the pipe 14 and the channel 15.

By using sheets 45 wider than the panels such arrangements can be used to permit greater spacing between heating pipes while using a standard width of panel 10a. These arrangements are therefore more economical where a lower heat output is required. Furthermore, by interposing unheated sheets 45 between some of those having a panel 10a secured to them, a still lower heat output can be provided.

Any convenient means of connecting the sheets 45 together or supporting them in edge-to-edge relationship may be provided.

I claim:

1. A ceiling panel means for a heat radiating ceiling comprising a panel which has oppositely-facing first and second major surfaces and is extruded in one piece from a metal having good heat conduction properties, said first major surface having formed thereon an integral central, lengthwise extending solid broad rib formation defining lengthwise extending channel means of part-cylindrical form having a predetermined radius of curvature, for having seated therein a lengthwise extending pipe conveying a heat transfer fluid, said pipe having an external radius of curvature substantially equal to said predetermined radius of curvature, said solid broad rib formation providing means for retaining a one-piece band extending about said pipe to connect said channel means to said pipe in good heat conducting contact with said panel and providing a broad metal heat conductive path to said second major surface, whereby said panel, when connected to said pipe, radiates heat directly to a space below said second major surface.

2. A ceiling panel means as claimed in claim 1, wherein the second major surface is formed with one or more lengthwise ribs.

3. A ceiling panel means as claimed in claim 1, wherein said first and second major surfaces are substantially flat surfaces, said rib formation extending perpendicularly outward from said first major surface.

4. A ceiling panel means as claimed in claim 1, wherein the panel has side edges remote from the broad rib formation and interengagement means are provided at said side edges.

5. A ceiling panel means as claimed in claim 4, wherein said interengagement means are adapted to provide a tongue and groove engagement between each panel and the laterally adjoining panel or panels.

6. A ceiling panel means as claimed in claim 1, further including a band in the form of a clip having two ends and wherein the retaining means comprises portions in which the ends of the clip engage with a snap action.

7. A ceiling panel means as claimed in claim 2, wherein said clip has a part-circular central section for lying against the pipe, two legs which extend obliquely outwards away from each other from said central section, the free ends of said legs extending inwards towards each other to form retaining feet and said portions comprise undercuts on the broad rib formation in which undercuts the feet engage with said snap action.

8. A ceiling panel means as claimed in claim 7, wherein said undercuts have an enlarged inner end portion adapted to receive and retain pins inserted at the ends of the panels for aligning the ends of adjoining panels disposed in a line extending parallel to the pipe.

9. A ceiling panel system comprising an array of metal sheets each having major upper and lower surfaces, which sheets are arranged in substantially coplanar relation, and at least two ceiling panels extending parallel to each other, each ceiling panel having oppositely-facing first and second major surfaces and being formed in one piece from a metal having good heat conduction properties, said first major surface having formed thereon a central, lengthwise extending broad rib formation defining lengthwise extending channel means, of part-cylindrical form having a predetermined radius of curvature, for receiving a lengthwise extending pipe conveying a heat transfer fluid, said pipe having an external radius of curvature substantially equal to said predetermined radius of curvature, said broad rib formation providing means for retaining a one-piece band extending about said pipe to connect said channel means to said pipe in good heat conducting contact with said panel, the ceiling panels having their second major surfaces secured in close face-to-face contact with said major upper surfaces of respective sheets of said array.

10. A ceiling panel system as claimed in claim 9, wherein said major upper and lower surfaces are substantially flat surfaces, said rib formation extending perpendicularly outward from said first major surface.

11. A ceiling panel means for a heat radiating ceiling comprising a panel which has oppositely-facing first and second major surfaces and is extruded in one piece from a metal having good heat conduction properties, said first major surface having formed thereon an integral central, lengthwise extending solid broad rib formation defining lengthwise extending channel means of part-cylindrical form having a predetermined radius of curvature, for having seated therein a lengthwise extending pipe conveying a heat transfer fluid, said pipe having an external radius of curvature substantially equal to said predetermined radius of curvature, said solid broad rib formation providing means for retaining a one-piece band extending about said pipe to connect said channel means to said pipe in good heat conducting contact with said panel and providing a broad metal heat conduction path to said second surface and further comprising a metal sheet having good heat conduction properties and having upper and lower major surfaces, said second major surface of said panel being secured in good heat conducting, close face-to-face contact to said upper major surface of said metal sheet whereby, when said panel is connected to said pipe, said lower major surface of said metal sheet radiates heat directly to a space below said lower major surface.

12. A ceiling panel means as claimed in claim 11, further including a band in the form of a clip having two ends and wherein the retaining means comprises portions in which the ends of the clip engage with a snap action.

13. A ceiling panel means as claimed in claim 12, wherein said clip has a part-circular central section for lying against the pipe, two legs which extend obliquely outwards away from each other from said central section, the free ends of said legs extending inwards towards each other to form retaining feet and said portions comprise undercuts on the broad rib formation in which undercuts the feet engage with said snap action.

* * * * *